US010859391B2

(12) United States Patent
Beaurepaire et al.

(10) Patent No.: US 10,859,391 B2
(45) Date of Patent: Dec. 8, 2020

(54) METHOD, APPARATUS, AND COMPUTER PROGRAM PRODUCT FOR PREDICTING RANGE OF AN ELECTRIC VEHICLE

(71) Applicant: HERE GLOBAL B.V., Eindhoven (NL)

(72) Inventors: Jerome Beaurepaire, Berlin (DE); Stephan Kosmella, Berlin (DE)

(73) Assignee: HERE Global B.V., Eindhoven (NL)

( * ) Notice: Subject to any disclaimer, the term of this patent is extended or adjusted under 35 U.S.C. 154(b) by 164 days.

(21) Appl. No.: 16/201,691

(22) Filed: Nov. 27, 2018

(65) Prior Publication Data
US 2020/0166356 A1    May 28, 2020

(51) Int. Cl.
| | | |
|---|---|---|
| *G01C 21/34* | (2006.01) | |
| *G06N 5/02* | (2006.01) | |
| *B60L 58/12* | (2019.01) | |
| *B60L 53/00* | (2019.01) | |

(52) U.S. Cl.
CPC .......... *G01C 21/3469* (2013.01); *B60L 58/12* (2019.02); *G06N 5/022* (2013.01); *B60L 53/00* (2019.02); *B60L 2240/62* (2013.01); *B60L 2240/66* (2013.01); *B60L 2240/662* (2013.01)

(58) Field of Classification Search
CPC ..... G01C 21/3469; B60L 58/12; B60L 53/00; B60L 2240/662; B60L 2240/62; B60L 2240/66; G06N 5/022
See application file for complete search history.

(56) References Cited

U.S. PATENT DOCUMENTS

| | | |
|---|---|---|
| 2010/0094496 A1 | 4/2010 | Hershkovitz et al. |
| 2011/0112710 A1 | 5/2011 | Meyer-Ebeling et al. |
| 2013/0079978 A1 | 3/2013 | Uyeki |
| 2013/0179057 A1 | 7/2013 | Fisher et al. |

(Continued)

FOREIGN PATENT DOCUMENTS

| | | |
|---|---|---|
| JP | 2010028963 A | 2/2010 |
| KR | 101500207 B1 | 3/2015 |

*Primary Examiner* — Yuen Wong
(74) *Attorney, Agent, or Firm* — Ditthavong & Steiner, P.C.

(57) ABSTRACT

A method, apparatus, and computer program product are provided for predicting range of an electric vehicle. The system may comprise at least one memory configured to store computer program code and at least one processor configured to execute the computer program code to at least determine future location prediction data for the electric vehicle based on a mobility profile, wherein the mobility profile comprises with historical usage data for the electric vehicle. The computer program code further comprises code to retrieve weather data from a weather service provider, wherein the weather data is associated with the future location prediction data of the electric vehicle and the weather data includes at least temperature data associated with the future location prediction data of the electric vehicle. Further, the computer program code comprises code to calculate a range prediction value for the electric vehicle based on the future location prediction data and the weather data, for predicting the range of the electric vehicle. Also, the computer program code comprises code to provide a notification associated with the predicted range of the electric vehicle to a user device.

17 Claims, 12 Drawing Sheets

(56) References Cited

U.S. PATENT DOCUMENTS

| | | | |
|---|---|---|---|
| 2013/0204456 A1* | 8/2013 | Tippelhofer | B60L 53/00 |
| | | | 701/1 |
| 2013/0218447 A1 | 8/2013 | Mayinger | |
| 2014/0379183 A1 | 12/2014 | Long | |
| 2016/0167643 A1 | 6/2016 | Tabanoglu et al. | |
| 2016/0368396 A1 | 12/2016 | Konet et al. | |
| 2019/0078903 A1* | 3/2019 | Shin | G01C 21/3697 |

* cited by examiner

METHOD, APPARATUS, AND COMPUTER PROGRAM PRODUCT FOR PREDICTING RANGE OF AN ELECTRIC VEHICLE

TECHNOLOGICAL FIELD

An example embodiment of the present invention relates to predicting the range of an electric vehicle, and more particularly, to using weather forecast data for estimating variations on the range of the electric vehicle.

BACKGROUND

As the world is moving towards finding greener solutions in transportation, electric vehicles have emerged as a successful alternative to fuel based vehicles. Electric vehicles are driven by electricity instead of fuel, and need to be recharged at specified distances for running. The maximum distance that an electric vehicle (EV) can cover, before needing a recharge is known as the range of the EV. The range of the EV is greatly affected by changes in temperature, both inside and outside the EV. But the impact of outside temperature, specifically due to extremely cold weather is more pronounced on EV batteries. Thus, it is imperative to predict and also indicate to users the effect of temperature changes on the EV batteries and the related driving ranges in order to avoid bad surprises for the users.

Specifically in extreme weather experiencing places, it would be very useful for commuters to know the range of their EV, considering weather conditions. For example, based on ground experiments, it has been observed that in extreme cold weather temperature of e.g., 20° F. or 6.7° C. or below, the EV battery range can drop by as much as 57%, giving an average range of just 43 miles/69 km. Similarly, in extreme hot weather temperatures of say, 95° F. or 35° C. or above, it was observed that the EV battery range dropped by 33%, giving an average range of 69 miles/111 km for a fully charged EV.

Thus, it would be beneficial to be able to gauge the impact of outside weather on range of EV, so that commuters can be better prepared for every situation and also be able to opt for safer and greener modes of travel, without worrying about limitations of green technologies and solutions.

BRIEF SUMMARY

Extreme temperatures, such as below 0° C./32° F. or above 30° C./86° F. have an effect on battery performance, as the State of Charge (SOC) of a battery of an electric vehicle is affected greatly outside the ideal operating temperature range. Some electric vehicles may use certain equipment or components to maintain the temperature of a battery within the ideal operating temperature range, which in turn consumes electricity, having an impact on the SOC. Even a vehicle's heating, ventilation, and cooling (HVAC) systems have an effect on SOC dependent on outside weather, as HVAC systems require electricity to maintain a pleasing environment for the driver and passengers. Thus, to overcome the challenge of impact of outside temperature on the range of an EV and to better prepare a user/commuter for unexpected changes in range of the EV, the methods and systems disclosed herein provide for prediction of range of an electric vehicle based on temperature conditions, specifically weather conditions. The methods and systems provide for a range forecast for EV based on weather conditions at the location where the vehicle is and will be in the future. The weather conditions are estimated by polling weather information services, such as website of weather information service provider and using that information an estimate of an expected SOC/range as a function of outside weather may be calculated for the upcoming days/weeks. In some embodiments, the SOC/range may be depicted visually on a visual interface in the form of a daily estimate bar graph and/or as isochron lines on a map of a geographical region (with a time slider). Such a graphical or visual depiction may provide a forecast, that provides a visual depiction of range for the EV based on location data and weather data. That is to say, by involving forecasted location predictions and/or calendar entries, the range of the EV may be calculated knowing future stopping locations for a commuter's (also interchangeably referred to as user) journey (and the expected weather there) as well as considering weather conditions en route. In some example embodiments, the methods and systems may also be configured to provide recommendations to the user to avoid stopping their vehicle, such as the EV, in extreme weather condition, thus avoiding the impact of extreme temperature later on their course of journey. In some example embodiments, the recommendations may also include providing indications to the user on an output interface of the EV of not spending the vehicle's charge while being in stationary state. Further, the recommendations may include an indication on the output interface to seek garage parking or use an alternative vehicle for a planned travel. Thus, using the various embodiments of the methods and systems disclosed herein, the user may be able to effectively plan their journey with an EV, avoid any unexpected surprises due to changes in weather conditions and SOC of the vehicle, and have a more accurate estimate of the range of the EV, taking into account weather data. Since the methods and systems disclosed herein are able to provide for the use of future location prediction of the user to calculate the SOC forecast, thus, in some embodiments very dynamic recommendations may be provided to the user, such as to avoid stopping during the user's journey to preserve charge, if the weather conditions are expected to get extreme at a later point of time in the journey.

A method, system, and computer program product are provided in accordance with an example embodiment described herein for predicting the range of an electric vehicle. The system may include at least one memory configured to store computer program code and at least one processor configured to execute the computer program code to at least determine future location prediction data for the electric vehicle based on a mobility profile, wherein the mobility profile comprises historical usage data for the electric vehicle. Further the computer program code may include code to retrieve weather data from a weather service provider, wherein the weather data is associated with the future location prediction data of the electric vehicle and wherein the weather data includes at least temperature data associated with the future location prediction data of the electric vehicle. Also, the computer program code may include code to calculate a range prediction value for the electric vehicle based on the future location prediction data and the weather data, for predicting the range of the electric vehicle. Additionally, the computer program code may include code to provide a notification associated with the predicted range of the electric vehicle to a user device.

In some example embodiments, a method for predicting a range of an electric vehicle may be provided. The method may include determining future location prediction data for the electric vehicle based on a mobility profile, wherein the mobility profile comprises historical usage data for the electric vehicle. The method may further include retrieving weather data associated with the future location prediction data of the electric vehicle, wherein the weather data includes at least temperature data associated with the future location prediction data of the electric vehicle. Additionally, the method may include calculating, by a processor, a range prediction value for the electric vehicle based on the future location prediction data and the weather data, for predicting the range of the electric vehicle. Further, the method may include providing a notification associated with the predicted range of the electric vehicle to a user device.

Embodiments of the present invention may provide a computer program product including at least one non-transitory computer-readable storage medium having computer-executable program code portions or instructions stored therein. The computer-executable program code instructions, when executed by the computer, may be the computer to carry out operations for predicting range of an electric vehicle wherein the operations comprise determining future location prediction data for the electric vehicle based on a mobility profile, wherein the mobility profile comprises historical usage data for the electric vehicle. The operations further comprise retrieving weather data associated with the future location prediction data of the electric vehicle from a weather service provider, wherein the weather data includes at least temperature data associated with the future location prediction data of the electric vehicle. Further, the operations comprise calculating a range prediction value for the electric vehicle based on the future location prediction data and the weather data, for predicting the range of the electric vehicle. Additionally, the operations comprise providing a notification associated with the predicted range of the electric vehicle to a user device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
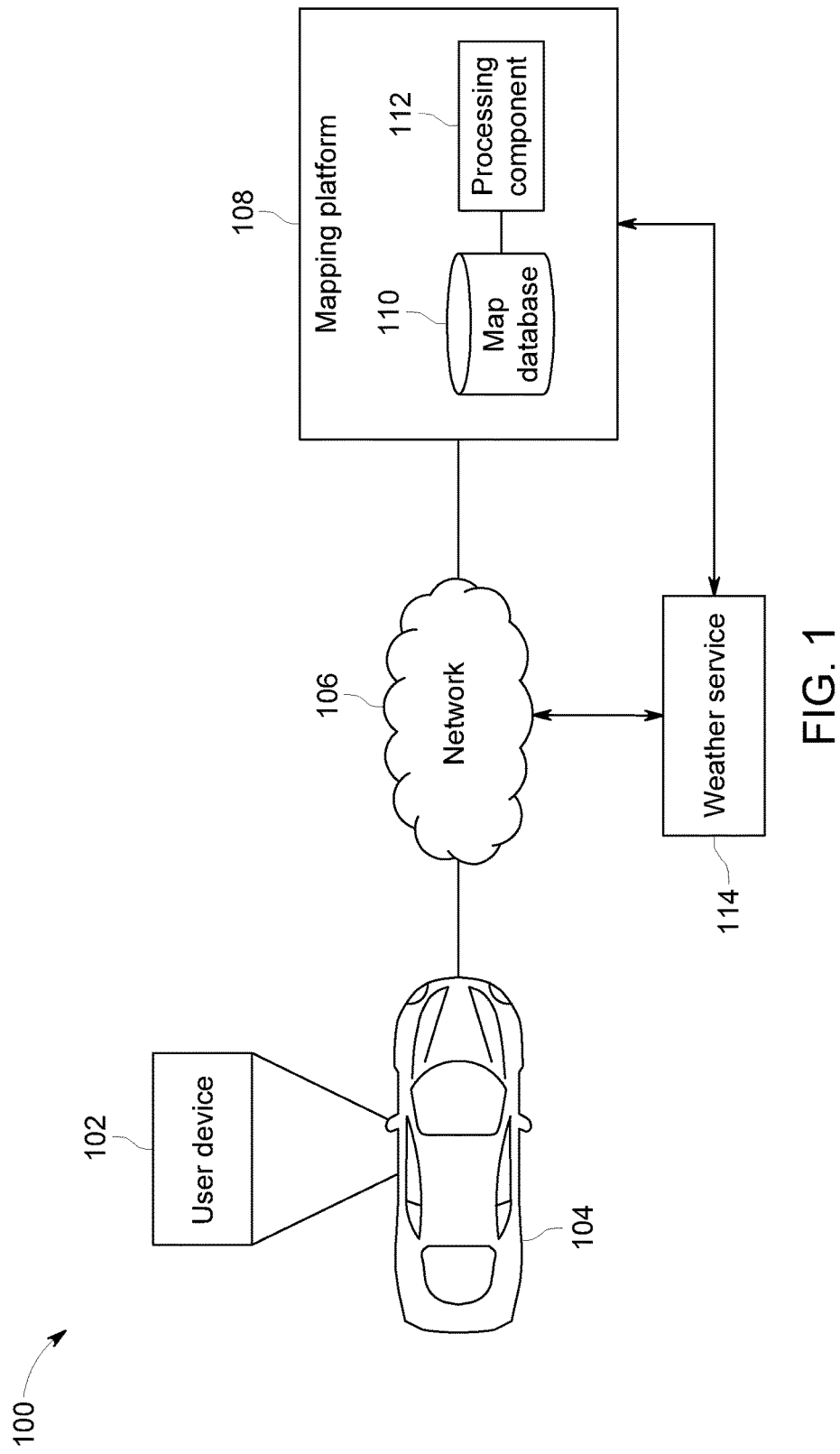
Figure 2:
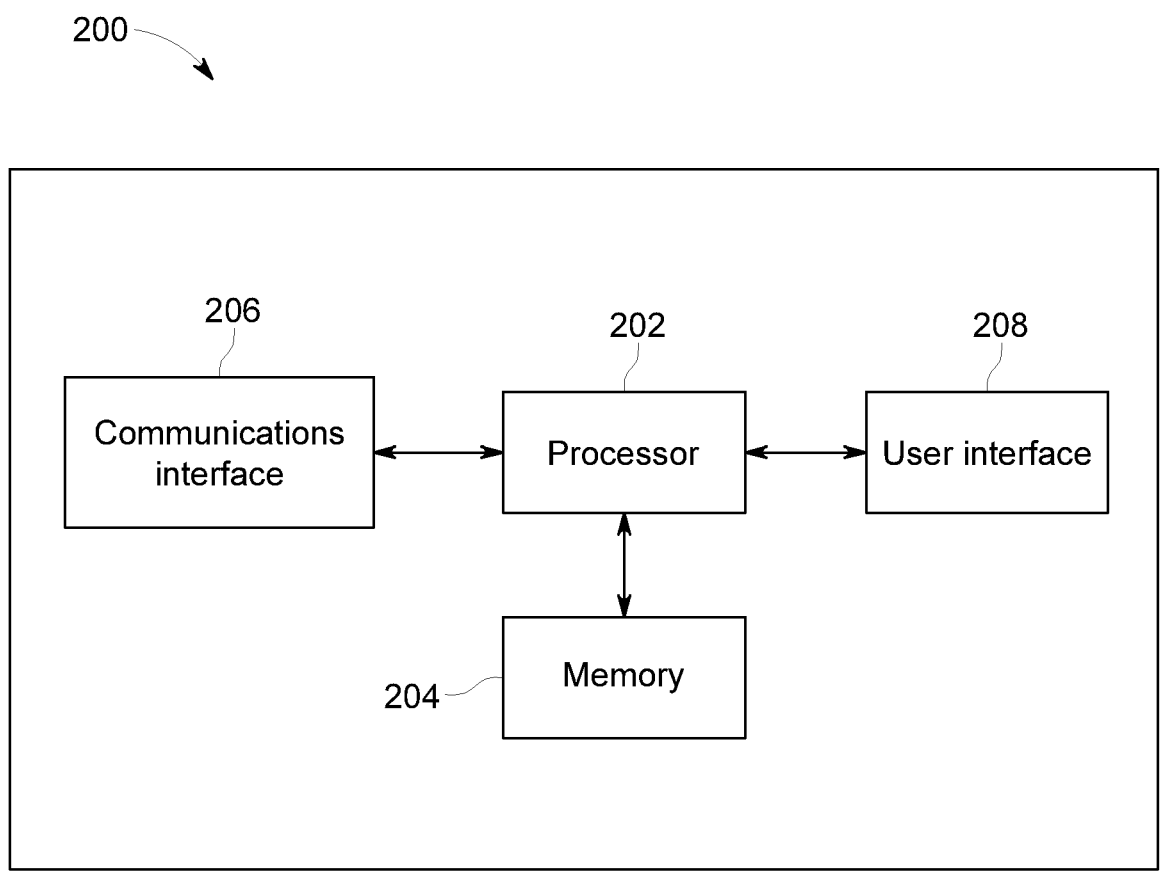
Figure 3:
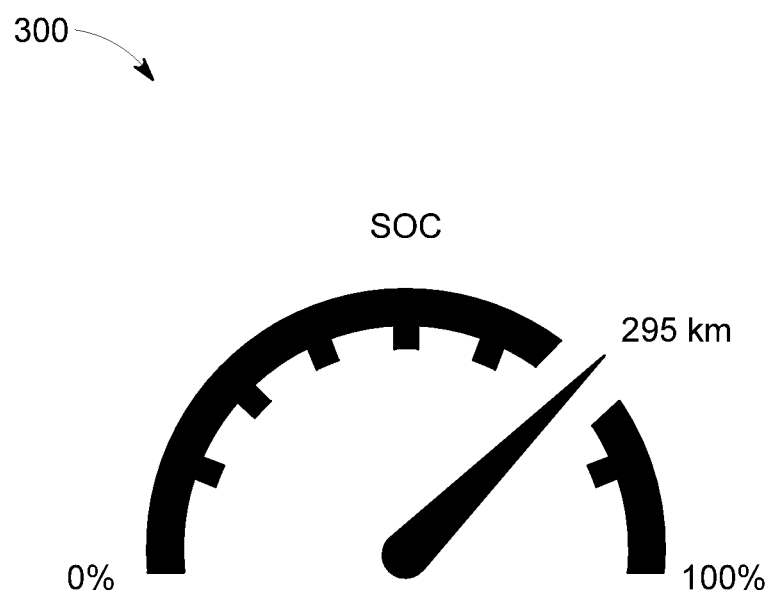
Figure 4:
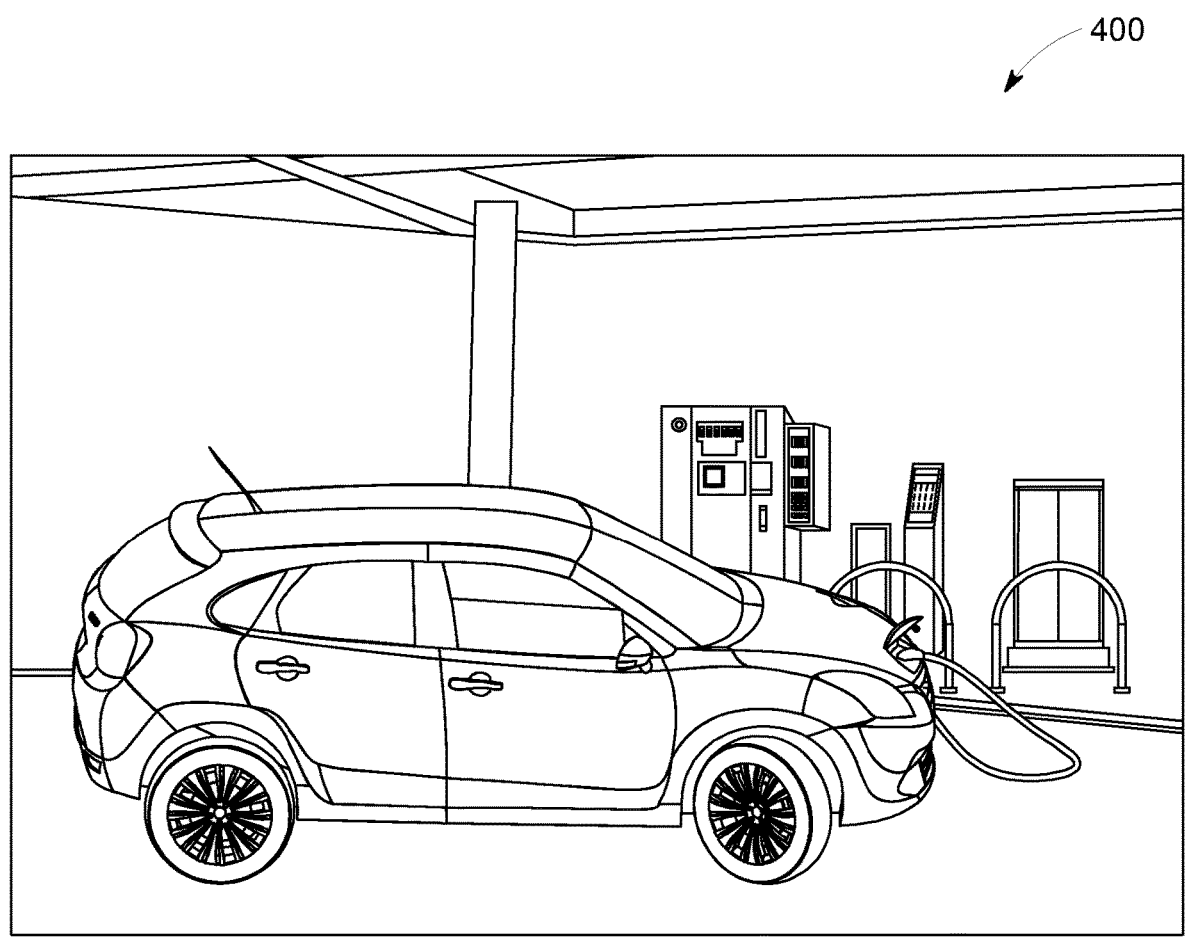
Figure 5:
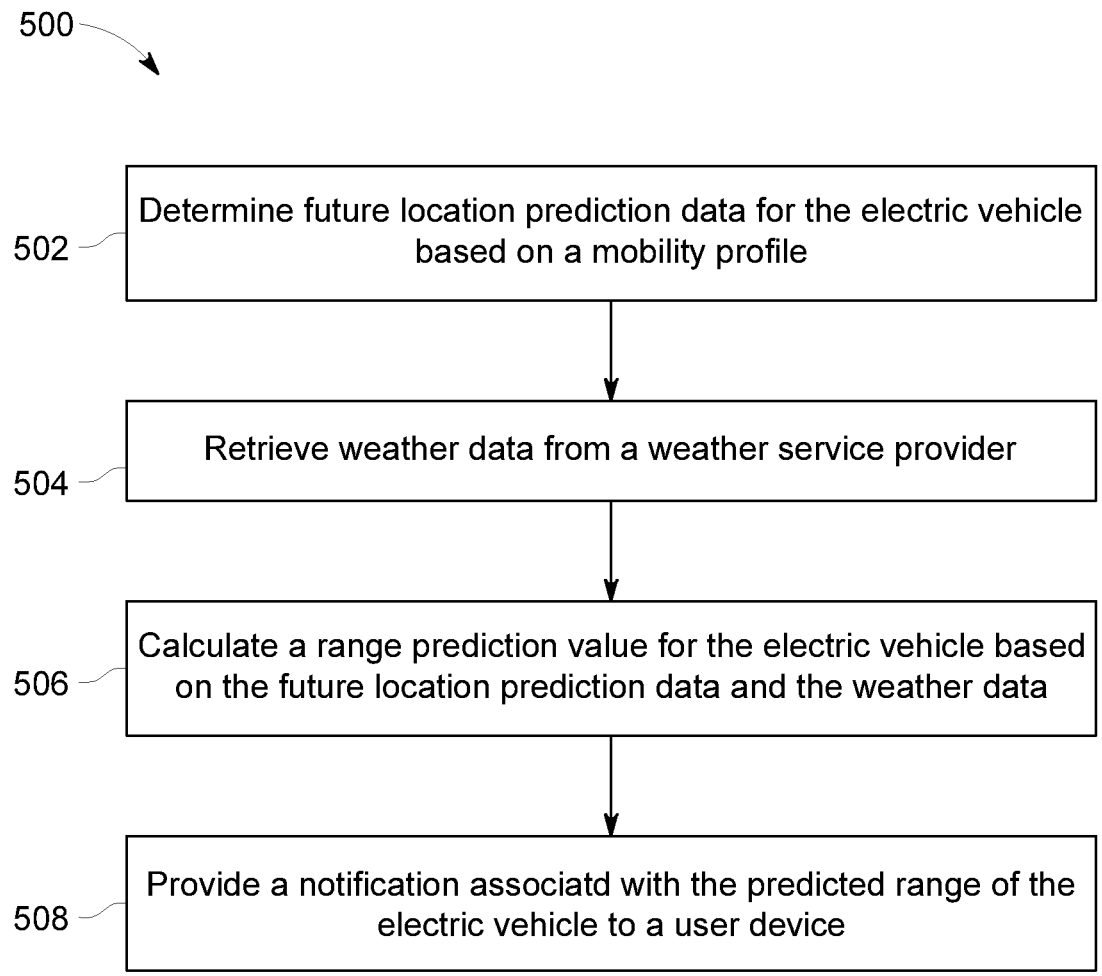
Figure 6:
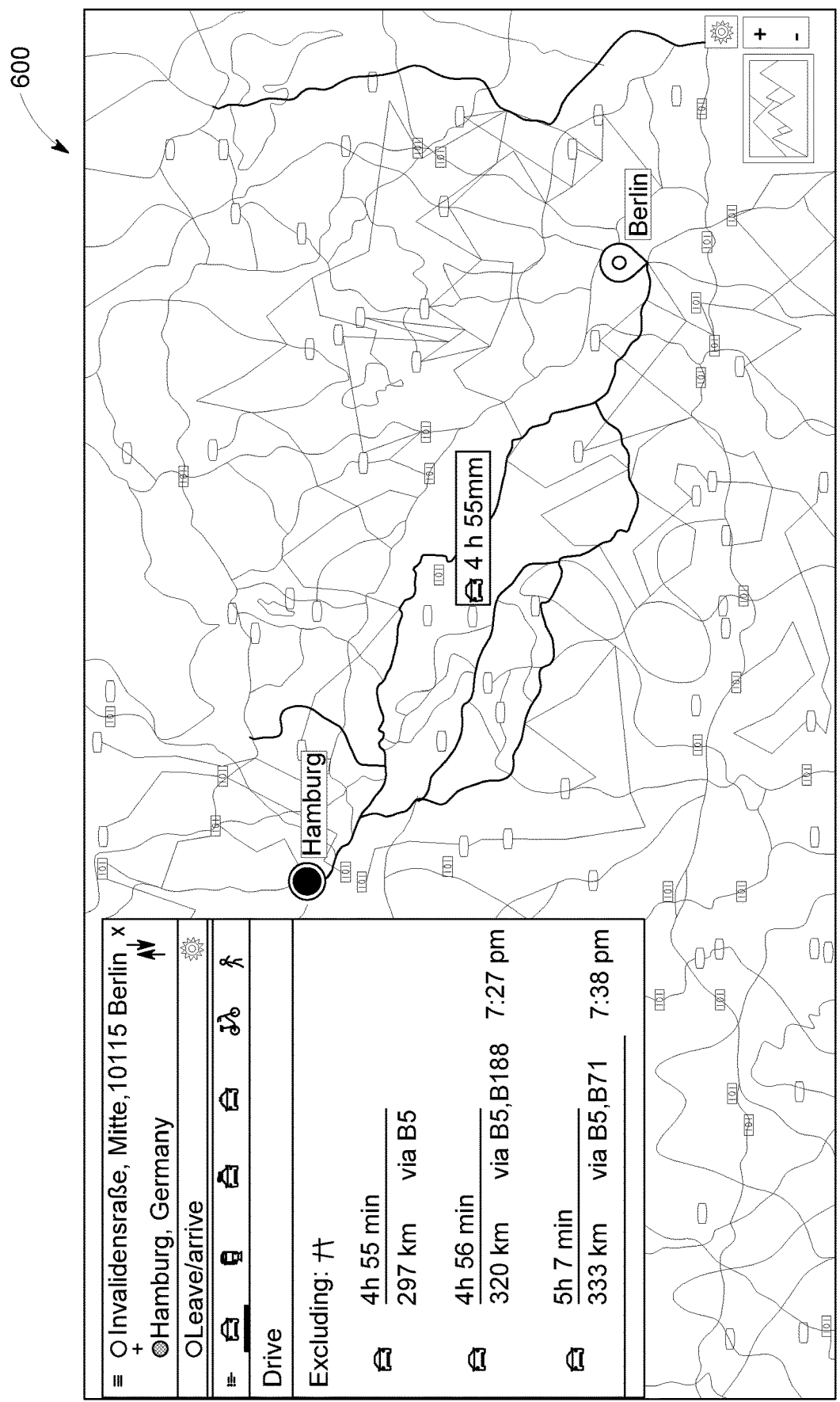
Figure 7:
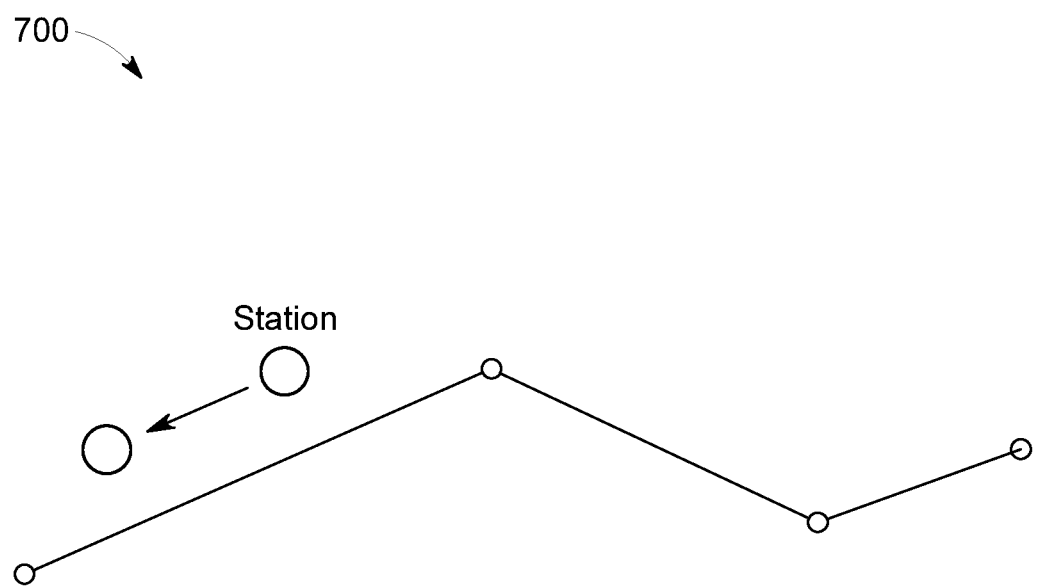
Figure 8:
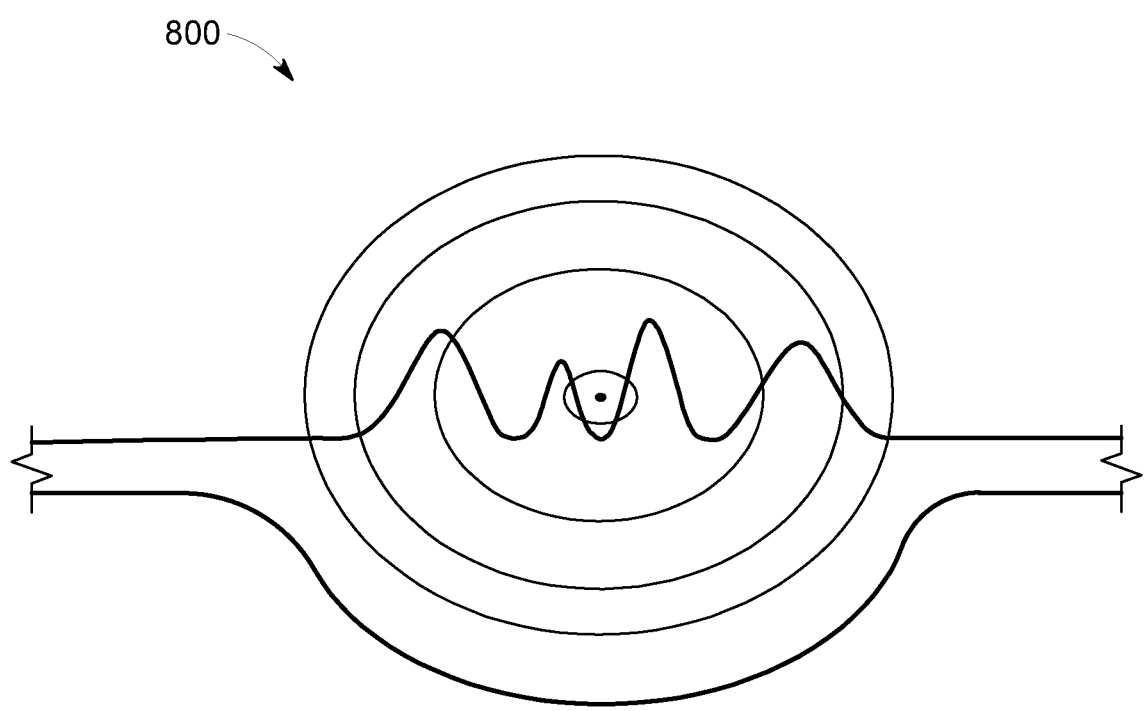
Figure 9:
Figure 10:
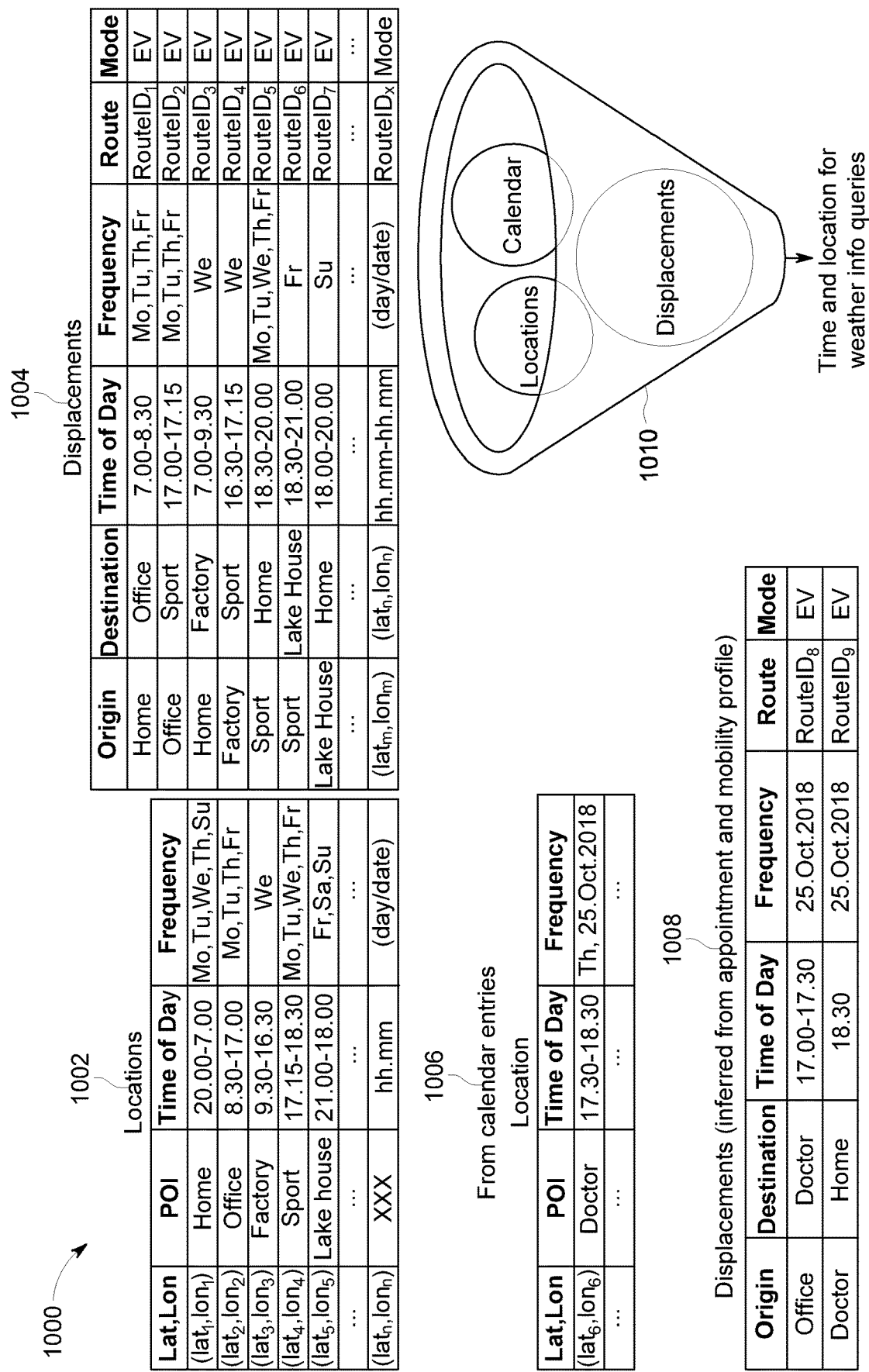
Figure 11:
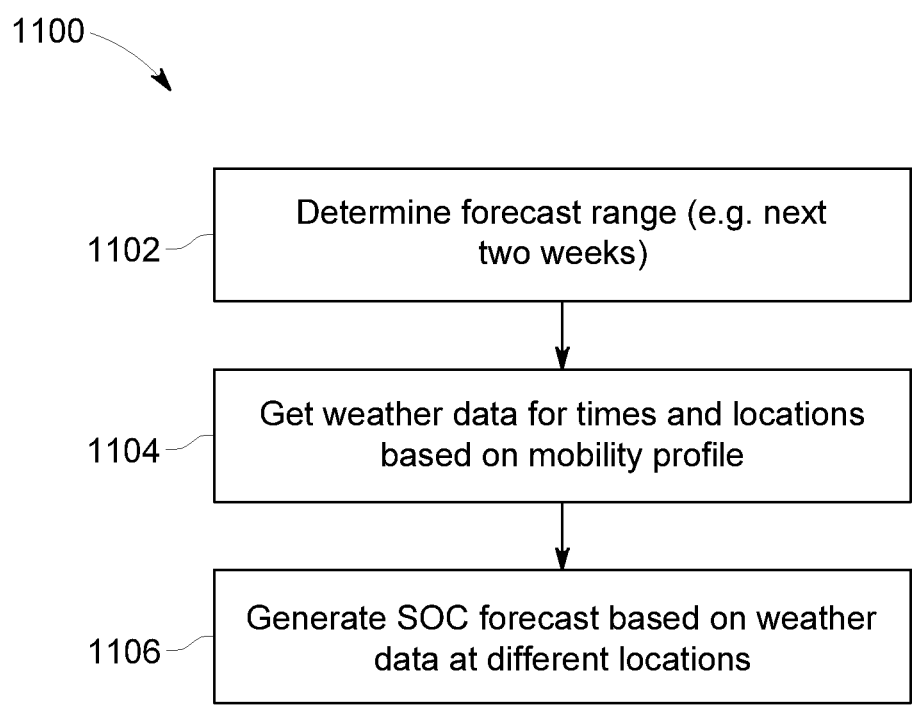
Figure 12:
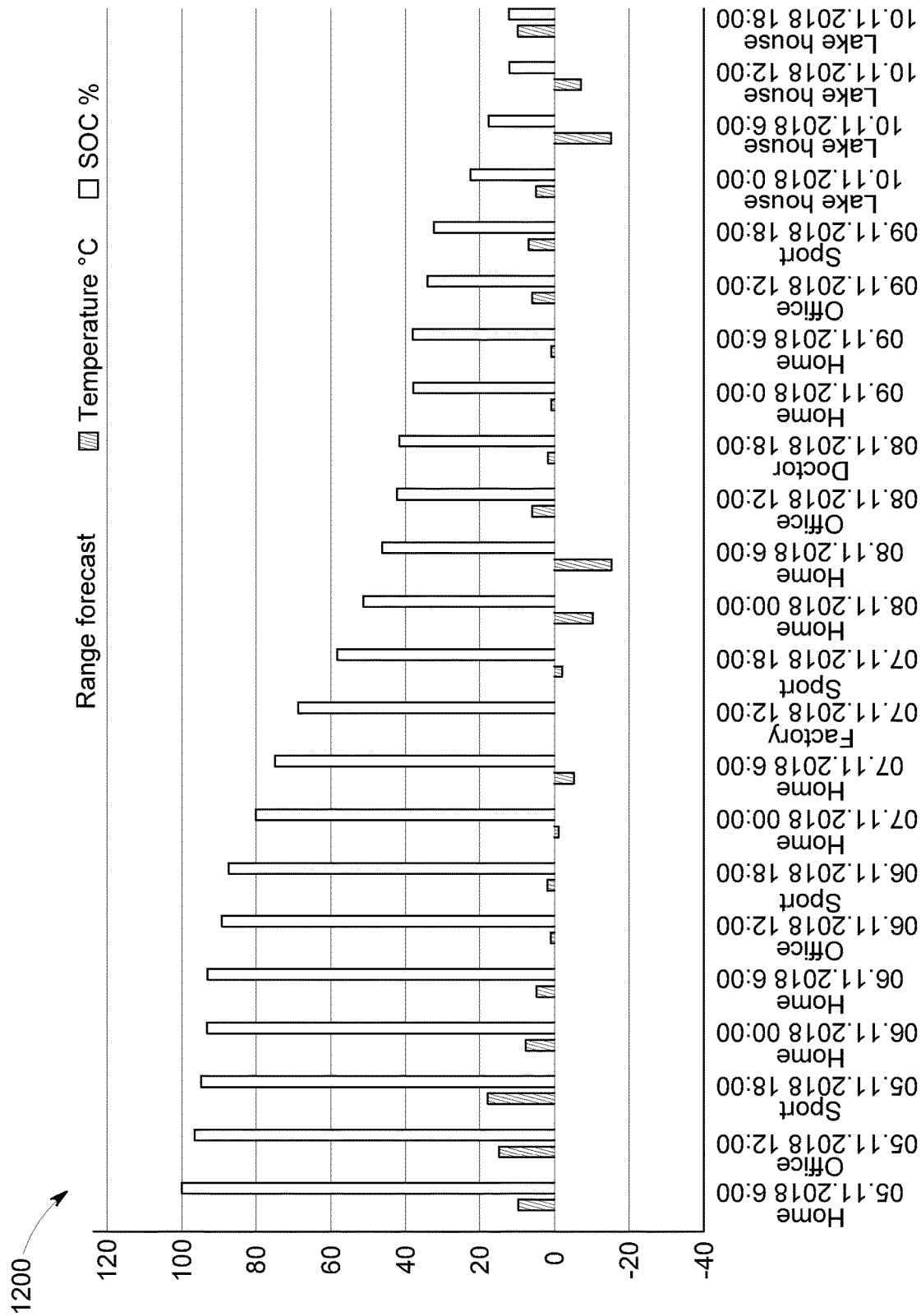

Having thus described example embodiments of the invention in general terms, reference will now be made to the accompanying drawings, which are not necessarily drawn to scale, and wherein:

FIG. 1 illustrates a block diagram of a system for predicting range of an EV in accordance with an example embodiment of the present invention;

FIG. 2 is a block diagram of an apparatus that may be specifically configured for predicting the range of EV in accordance with an example embodiment of the present invention;

FIG. 3 illustrates an exemplary depiction of State Of Charge (SOC) for the EV in accordance with an example embodiment of the present invention;

FIG. 4 illustrates an exemplary depiction of an extreme weather condition in accordance with an example embodiment of the present invention;

FIG. 5 is a flowchart of a method for predicting range of the EV in accordance with an example embodiment of the present invention;

FIG. 6 is an exemplary user interface for depicting a planned route of the user in accordance with an embodiment of the present invention;

FIG. 7 is an exemplary recommendation use case based on the range prediction method disclosed in the invention in accordance with an embodiment;

FIG. 8 is another exemplary recommendation use case based on the range prediction method disclosed in the invention in accordance with an embodiment;

FIG. 9 is an exemplary user interface providing a time slider visualization for the range of the EV in accordance with an embodiment of the present invention;

FIG. 10 illustrates exemplary data records for predicting range of an EV based on mobility profile data, in accordance with an embodiment of the present invention;

FIG. 11 illustrates an exemplary flow diagram of a method for generating SOC forecast for an EV based on mobility profile data, in accordance with an embodiment; and FIG. 12 illustrates an exemplary graph showing the impact of temperature on the range of an EV, in accordance with an embodiment of the invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus, and computer program product are provided herein in accordance with an example embodiment for providing prediction of range for an electric vehicle (EV). The range predictions methods and systems disclosed herein take into account the effect of weather data on the range of the EV. As already discussed, outside temperature, such as due to weather conditions, can adversely affect the range of an EV, specifically in extreme weather conditions. Some EVs come with active thermal management systems which work to minimize the effects of extreme external temperatures. This may be done by keeping the battery cooled or heated enough for it to run at its optimum operating temperature irrespective of the external temperature. Climate control systems for regulating temperature inside the driver/passenger area, also known as HVAC, may also operate automatically in response to exterior weather conditions. But these thermal management systems, be it a HVAC system of a car or an active thermal management system for a battery or other vehicle components, need energy to operate, which in turn affects the overall range of the EV in dependence of exterior weather conditions. Also, in extreme weather conditions which persist for days, sometimes the EV may be exposed to such conditions, particularly when not moved and even left outside for a prolonged period, e.g. a couple of days. During this time, the energy of the EV lost due to such weather conditions does not regenerate effectively reducing the SOC. Also, when after the energy loss, range of the vehicle is calculated, the range calculation on EVs is based on whatever energy amount is left on the battery. So, the range will be recalculated when the EV is started, and that range may be entirely different, most probably lower, than the range estimate taken a couple of days earlier. But, with the methods and systems disclosed herein, range may be predicted hours or days in advance, even considering HVAC use or battery thermal management for the range calculation, thus providing more reliable and accurate range prediction to the user.

Further, the methods and systems disclosed herein provide for predicting a future location for the EV and the predicted future location of the EV is used to obtain a weather prediction corresponding to the future location. Further, the EV and/or the user of the EV may be associated with a mobility profile, which may be analyzed to identify in advance the future locations where the EV will experience particular weather conditions. These locations need not only be locations where the vehicle, such as the EV, stops, but may also comprise routes with variable climate conditions as the route progresses in both time and space. The identification of these locations and their associated weather conditions may further provide more accurate range predictions and prepare the user/driver of the vehicle for commutes in all types of weather conditions.

Thus, using the methods and systems disclosed herein allows EV car drivers to avoid unexpected surprises related to their driving range by considering the anticipated impact of temperatures on the battery levels (and thus the driving range).

In some embodiments, the methods and systems disclosed herein provide for consideration of the impact of the anticipated temperature on the EV range.

Also, in some other embodiments, the user may be notified in case of risk of not being able to reach a planned destination (manually entered or predicted destination) based on the predicted range of the EV. Thus, the methods and systems disclosed herein may provide accurate range prediction of an EV, which in turn provides more reliability, safety, and comfort to the user in the use of EV, even when weather conditions are extreme.

FIG. 1 illustrates a block diagram of a system for predicting range of an EV in accordance with an example embodiment of the present invention.

The system 100 may be configured to provide accurate range prediction of an EV while taking into account the impact of extreme weather on the range. The system 100 may include user device 102 that may be associated with a vehicle 104, such that the vehicle 104 may be an electric vehicle in some embodiments. The vehicle 104 and the user device 102 may be in communication with a mapping platform 108 through a connection over a network 106. The network 106 may be a wired, wireless, or any combination of wired and wireless communication networks, such as cellular, Wi-Fi, internet, local area networks, or the like. In some embodiments, the network 106 may be Internet. The user device 102 may be connected over the network 106 connection with the mapping platform 108 that may be configured to provide several navigation assistance and mapping application services. The mapping platform 108 may include a map database 110 and a processing component 112 for provision of navigation and mapping services to a user of the vehicle 104, using the user device 102. The system 100 may also include a weather service 114 that may be used to provide weather related data to the user device 102 and/or mapping platform 108 through a connection over the network 106 or through a direct connection.

In some example embodiments, the user device 102 may itself be configured to run a mapping application that may provide range prediction for the EV based on a mobility profile, a battery consumption model of the EV, and a range calculation component along with accessing the weather service 114 for obtaining weather data for specific locations. The mobility profile may be used to provide information related to a future location of the EV, such as based on historical usage data of the EV and the user, the routes and appointments undertaken by the user and the like. In some example embodiments, the user device 102 may include onboard several modules and/or components for providing information related to the mobility profile with possible future routes and locations, the routing requirements of the EV, the battery consumption model and the range calculation.

In some example embodiments, the user device 102 may be configured to use the data provided by these different onboard components, and retrieve weather data from weather service 114 to provide accurate range prediction for the EV with minimal resources. Further, in some embodiments, the user device 102 may not require to be connected to the network 106 at all times and may also be able to perform all the processing for performing the range prediction function in offline mode. For example, the user device 102 may retrieve weather data for a predicted future location of the vehicle 104 whenever it finds network connectivity, and using this data, may perform calculation of range prediction offline.

In some embodiments, the range prediction function may be performed by a cloud based service, such as using the processing component 112 of the mapping platform 108. In such a scenario, the map database 110 may be configured to store all the data related to mobility profile, routes information, battery consumption model of the EV and the like. Further, the processing component 112 may be configured to use the data stored in the map database 110, along with weather data obtained from weather service 114 to provide prediction of range for the EV. The predicted range and associated data may then be forwarded to the user device 102. The distribution of processing flow in this manner may provide an increase in processing speed and also reducing the cost of the user device 102 overall as complicated processing related hardware may not be needed to be implemented in the user device 102. Further, using the cloud based architecture, multiple different types of user devices may be used for accessing the mapping application data. Examples of such varied types of user devices may include such as mobile phone, tablet, smartphone, PDA, handheld device and the like.

In some example embodiments, the user device 102 may be associated, coupled, or otherwise integrated with the vehicle 104, such as in the form of an advanced driver assistance system (ADAS), a vehicle infotainment unit for example. In some example embodiments, the vehicle infotainment unit may be configured to provide a display of range forecast data, along with weather data, based on the predicted range of the EV. Additional, different, or fewer components may be provided. For example, many user devices 102 may connect with the network 106. The user device 102 may include a mobile computing device such as a laptop computer, tablet computer, mobile phone, smart phone, navigation unit, personal data assistant, watch, camera, or the like. Additionally or alternatively, the user device 102 may be a fixed computing device, such as a personal computer, computer workstation, kiosk, office terminal computer or system, or the like. In some embodiments, the user device 102 may be configured to access the map database 110 via the processing server 112 through, for example, a mapping application, such that the user device 101 may provide navigational assistance to the user among other services provided through access to the mapping platform 107.

The map database 110 may include node data, road segment data or link data, point of interest (POI) data, or the like. The map database 110 may also include cartographic data, routing data, and/or maneuvering data. According to some example embodiments, the road segment data records may be links or segments representing roads, streets, or paths, and may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, schools, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

In some example embodiments, the map database 110 may also include data about a mobility profile for the user, based on the POIs, user destination, user location and the like. The mobility profile may be associated with a mobility graph, which may store information about the user's behavior, such as a driver's behavior, in order to identify behavioral patterns and leverage them in route prediction and range prediction services offered by the mapping platform 108.

In some example embodiments, the mapping platform 108 may comprise or may be coupled to a graph database, which may comprise data related to mobility profile. For example, such a graph database may include data about a user's trips and locations for different periods of time (such as hourly, daily, weekly, or monthly). Further, the various locations may be recorded as (lat,lon coordinates), optionally with a reference to a POI (which can be looked up in the map database 110). The graph database may also include information about routes described in terms of starting time, end time, mode of transport, frequency—that is to say day(s) of the week, and the like. Some exemplary data records that may be stored in the graph database are depicted in the various tables illustrated in FIG. 10, which will be described later.

The mobility graph may be generated by a learning engine, based on the mobility profile related data, wherein the learning engine may form a part of the processing component 112 in some embodiments. In some example embodiments, the mobility graph may include decision points that may be intersections on a commute where the user has relevant options to proceed. For example, when a user sets off from point A, the user may take the same street and direction for reaching destinations B, C, and D. The decision points help to disambiguate which is the actual destination of the user out of B, C, and D. Further, using the data about decision points, the mobility profile may be used to enable predictions of likely destinations and routes of the user based on recorded user behavior and further dependent on the current time and location of the user. This can include destination prediction, route prediction, most probable path prediction and personalized routes. Thus, using the mobility profile, it may be possible to predict a future location for the user travelling in the vehicle 104, which may be an EV. The future location data, along with some additional information, such as information about weather of the future location may be used to predict the range of the EV 104 is some example embodiments.

The predicted range may further be used to provide notifications to the user regarding the predicted range, such as on a user interface associated with the user device 102, in order to enable the user to take most advantageous route planning and driving decisions, specially while using the EV 104 in extreme weather conditions.

In some example embodiments, the notifications may be generated by the mapping platform 108 and use the data stored in the map database 110, which may be maintained by a content provider e.g., a map developer. By way of example, the map developer can collect geographic data to generate and enhance the map database 110. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 110 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, range prediction and other functions, by a navigation device, such as by user device 102, for example. Further, data may be compiled relating to parking space availability along different road segments of the map database 110, where a parking availability estimation may be generated in dependence of time of day, day of week, season of the year, special events, etc. The navigation-related functions can correspond to vehicle navigation, pedestrian navigation, or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 110 may be a master geographic database, but in alternate embodiments, a client side map database 110 may represent a compiled navigation database that may be used in or with end user devices (e.g., user device 102) to provide navigation and/or map-related functions. For example, the map database 109 may be used with the end user device 102 to provide an end user with navigation features. In such a case, the map database 110 can be downloaded or stored on the end user device (user equipment 102) which can access the map database 110 through a wireless or wired connection, such as via a processing component 112 and/or the network 106, for example.

In one embodiment, the end user device 102 can be an in-vehicle navigation system, an infotainment system, an Advanced Driver Assistance System (ADAS), a personal navigation device (PND), a portable navigation device, a cellular telephone, a smart phone, a personal digital assistant (PDA), a watch, a camera, a computer, a server accessible via a web browser or app and/or other device that can perform navigation-related functions, such as digital routing and map display. An end user can use the user device 102 for navigation and map functions, or for range prediction functions, such as guidance and map display, for example, and for determination of one or more personalized routes or route segments based on one or more calculated, predicted, and/or recorded routes, according to some example embodiments.

In some example embodiments, the processing component 112 may receive probe data from the vehicle 104. The vehicle 104 may include one or more detectors or sensors as a positioning system built or embedded into the vehicle 104. In some embodiments, the vehicle 104 may receive location data from a positioning system, such as a Global Navigation Satellite System (GNSS), such as the Global Positioning System (GPS), cellular tower location methods, access point communication fingerprinting, or the like. In some embodiments, the user device 102 may be configured as a probe device to collect probe data for the vehicle 104. The probe data (e.g., collected by the user device 102) may be representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The user device 102, may be any device capable of collecting the aforementioned probe data. Some examples of the user device 102, some of which have already been discussed earlier may include specialized vehicle mapping equipment, navigational systems, mobile devices, such as phones or personal data assistants, or the like. The user device 102 in communication with the mapping platform 108 may be configured to provide the user with data about the vehicle 104, such as a data about predicted range of the vehicle 104 using the various components of the mapping platform 108. In some embodiments, the mapping platform 108 may be embodied in the form of an apparatus, as illustrated in FIG. 2.

The apparatus 200, such as that shown in FIG. 2, may be specifically configured in accordance with an example embodiment of the present invention for predicting the range of the EV 104. The apparatus 200 may include or otherwise be in communication with a processor 202, a memory device 204, a communication interface 206, and a user interface 208. In some embodiments, the processor 202 (and/or co-processors or any other processing circuitry assisting or otherwise associated with the processor) may be in communication with the memory device 204 via a bus for passing information among components of the apparatus. The memory device 204 may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor.

Additionally or alternatively, the memory device could be configured to store instructions for execution by the processor.

In some embodiments, the apparatus 200 may be embodied by the mapping platform 108, wherein the processor 202 may be embodied by the processing component 112 and the memory device 204 may be a form of the map database 110. However, in some embodiments, the apparatus 200 may be embodied as a chip or chip set. In other words, the apparatus 200 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus 200 may therefore, in some cases, be configured to implement an example embodiment of the present invention on a single "system on a chip." As such, in some cases, a chip or chipset may constitute a means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user devices 102 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

In some example embodiments, the apparatus 200 may be configured to provide a prediction of range for the EV 104, based on weather forecast data obtained from a weather service provider and a future location prediction data of the user, based on the mobility profile described earlier. The range of the EV may be a function of a state of charge (SOC) of the EV, which may describe the current battery charge level of an electric battery included in the EV. FIG. 3 provides a visual illustration for the SOC of the EV. As illustrated in FIG. 3, an EV 300 may have different ranges of travel, based on different charge levels of the battery included in the EV 300. For example, the EV 300 may have a range of 295 km based on the current SOC of the battery, as indicated by the dash indicator of FIG. 3. The dash indicator provides an indication of SOC in % and corresponding range of the vehicle in km. The range of the vehicle is dependent on various factors such as: 1) the SOC; 2) the EV consumption model, which may define how the EV dissipates its power while driving, which may vary from vehicle to vehicle; and 3) the future location prediction for the EV and the expected temperatures at those locations. The SOC may indicate how much charge is left in the battery, but the range of the EV, as illustrated in FIG. 3 may be variable at different times, depending on weather or temperature conditions and the predicted future locations.

Also, as already noted earlier, the effect of temperature on the SOC of the battery and EV consumption model also needs to be factored in before calculating an exact range for any EV. This is because, the model of discharge of the battery or the EV consumption model may get altered in extreme hot or extreme cold weathers. Thus, to accurately predict the range for an electric vehicle, the relationship between EV range and temperature changes needs to be evaluated.

In some embodiments, the methods and systems disclosed herein provide for predicting the charge level for the battery of the EV at future times and locations ((t1,l1), (t2,l2) . . . (tx,lx)) considering the impact of weather changes until those moments (t1, t2, . . . tx). Thus, using the methods and systems of the present invention, the users of an electric vehicle may be better prepared for their journeys undertaken in extreme weather conditions, and avoid bad surprises due to unprecedented changes in the range of the EV. For example, if on a particularly cold day, the user had planned to take a trip to a friend's house some miles away, the unexpected low battery level may prevent the user from undertaking such a trip. However, using the range prediction algorithm disclosed herein, the user may be warned that due to weather forecast suggesting extreme cold weather on some particular location, the range of their EV may drop significantly. Thus, the user may decide to recharge the EV during some intermediate days or may plan a trip including a charging station on the way, to be better prepared for their intended trip or action. For example, the user knows that if the car is fully charged and s/he uses it one week later, it still generally has about 80% battery and a range of 75 mi/120 km, sufficient for the week end related activities. However, if a temperature drop during 2 days that week makes the battery level drop to 40%, then the user will have the bad surprise to have a very limited range next time s/he uses the car. These bad surprises can be prevented using the accurate range prediction methods disclosed in the invention. Further, the user may perform alternate actions in preparation of an extreme weather day, well in advance, if they are notified on time for such conditions. For example, on an extremely cold day, as depicted in FIG. 4, the user may be warned that a given battery level is reached or planned to be reached within a given timeframe. For example, user may be provided an audio notification or a visual notification on a user interface for a message like, "Based on foreseen weather conditions and current charge level, your EV car's range may drop to 62 miles/100 km on Wednesday". Thus, the user may plan a re-charging of the EV before Wednesday, to maximize the range of the EV.

In some scenarios, the user may also be notified while they are undertaking a trip, to plan their actions during the trip according to weather forecast data and predicted range of their EV. The user may be provided notifications to not stop their vehicle during a journey based on weather data. For example, on an extremely cold winter day, such as depicted in FIG. 4, the user may be planning to stop for dinner for couple of hours late in the night. The user at that time may have a low battery level but just enough range to reach its final destination afterwards. However, the temperature may be dropping very quickly and its battery may lose 10% within a short period of time, such as may be within 3 hours, reducing the vehicles' (already limited) range and hence not allowing the user to reach its final destination. In this situation, the system could trigger an alert such as: "It is not recommended to stop here more than one hour if you still want to reach your destination tonight" or "Based on your current range and the planned battery's discharge related to today's extreme weather conditions, it may be wiser to now continue your journey towards your destination and not stopping now if not urgent."

The alert may be provided to the user in the form of a visual display of message or an audio notification, e.g. on user device 102.

Thus, using the range prediction algorithm, such as, implemented by a method disclosed in FIG. 5, the user may be provided timely notifications to plan their commutes wisely.

FIG. 5 is a flowchart of a method 500 for predicting range of the EV in accordance with an example embodiment of the present invention.

The method 500 may include, at 502, determining future location prediction data for the electric vehicle based on a mobility profile. In some embodiments, the mobility profile may be based on a historical usage data for the electric vehicle. In some other embodiments, the mobility profile may be based on the mobility pattern of the user, as described by a mobility graph, discussed earlier. For example, the mobility profile may describe the pattern of travel of the user of the electrical vehicle, such as which places a user visits on which days, a planned appointment of the user, a frequently traveled route of the user to a specified destination and the like. These travel patterns may help in identifying the future location of travel of the user. The future location may be a location to which the user plans to travel in a future instant in time.

The method 500 may further include, at 504, retrieving weather data from a weather service provider, such as the weather service 114 depicted in FIG. 1. The weather data may be data about expected temperature at the predicted future location of the vehicle, as may be retrieved from weather forecast data provided by a weather service provider. In some embodiments, the weather service provider may be a government agency or a meteorological department's website, from which weather forecast data may be downloaded. In some embodiments, the weather forecast data for a predetermined duration of time may be downloaded. The predetermined duration of time may correspond to a time interval till the next planned use of the electric vehicle. For example, if it is determined that the user will use the vehicle after two days, then weather forecast data, giving values for outside temperature, for two days may be downloaded from the weather service provider's website.

Further, the method 500 may include, at 506, calculating a range prediction value for the electric vehicle based on the future location prediction data and the weather data. The range prediction value may provide a range in terms of distance that the vehicle may be able to cover in the direction of travel of the predicted future location, considering the impact of the outside weather. In some example embodiments, the range prediction may also take into account the charge consumption model of the battery of the EV, to identify the SOC of the EV and subsequently the range prediction value for the EV. The SOC of the EV may be estimated based on an exemplary method, such as depicted in FIG. 11, which will be discussed later.

The method 500 may include, at 508, providing a notification associated with the predicted range of the electric vehicle to a user device. The user device may be the user device 102 installed in the vehicle 104. The notifications may include an audio notification, a visual notification, an audio-visual notification, a light indicator and the like. In some embodiments, the notification may be provided in the form of a text message displayed on a display screen associated with the user device 102. In some embodiments, a text message, such as "Do not stop now, weather is expected to get colder later" may be displayed to suggest a driving maneuver to the driver based on range prediction for the EV described in conjunction with the method 500. In some embodiments, said message may take the form of a message on a heads-up display. In some embodiments, the notifications may provide recommendations for anticipated actions to the users. For example, anticipating the drops in temperature through weather forecast, one notification may which day to charge the car in preparation of a trip, eg: "In preparation for your week end trip, the system recommends to wait until Thursday for the full battery charge as the very cold weather on Tuesday and Wednesday will likely impact your battery level and hence your range", in accordance with the range prediction provided by the method described in the flowchart 500.

FIG. 5 illustrates a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operation for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the method of FIG. 5 above may comprise a processor (e.g., the processor 202) configured to perform some or each of the operations (502-508) described above. The processor may, for example, be configured to perform the operations (502-508) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 502-508 may comprise, for example, the processor 202 and/or a device or circuit for executing instructions or executing an algorithm for processing information as described above.

In some embodiments, the method depicted in FIG. 5 may be used by the user of the EV to identify a range prediction value for the EV and correspondingly generate a recommendation for the user to plan their upcoming trips and appointments.

FIG. 6 is an exemplary user interface for depicting a planned appointment of the user in accordance with an embodiment of the present invention The user may be planning a trip from Berlin to Hamburg during a weekend, and may use a map based application to check the details of the trip, such as distance between a source location. Work in this case, and a destination location, Hamburg. The map application's interface may depict the distance value, mentioned here as about 300 km. The map application may be accessed by the user using their user device, which may be a mobile phone. Generally, when planning a trip in this manner, the map application may suggest the user to drive to their destination in one go. But, using the method 500 described herein, the user may be recommended that due to bad weather during the week, it is very likely that s/he will need to make a stopover, due to reduced range. Thus, the driving route presented to the user may take into account the presence of charging locations enroute and correspondingly a different driving route may be recommended to the user. It is also possible that a user does such a route every week end and hence knows that one full charge is "generally" enough. In such cases, the user may be notified that such a "drop" of battery level won't allow her/him to complete this trip in the usual way. Thus, the user may be recommended to make at least one or multiple stopovers during their journey. Correspondingly, an enhanced route may be suggested to the user, taking into account the multi-stopover adjustments.

FIG. 7 illustrates the use case depicting multi-stopover route adjustment recommendations being provided to the user in accordance with exemplary embodiments. Using the method 500, and using the range prediction value, the route of travel of the user may be optimized with the location of charging points based on current battery levels, called "enhancements of the route" Thus, a navigation system based on the method 500 may provide for dynamic adjustments of the route, such as recommending where a user should recharge and add an EV charging stopover accordingly.

In some example embodiments, at the beginning of a journey, when the user sits in the car, the navigation system could adjust all the charging related stopovers based on the information gathered about the weather conditions on the route, i.e. dynamically moving some charging locations earlier in the journey if the weather is much colder or hotter than anticipated. In some embodiments, some other factors related to range prediction may be taken into account.

FIG. 8 is another exemplary embodiment where the method 500 may be used to provide a navigation related recommendation to the user.

In the embodiment 800, EV routing may be done taking into account temperature drop in mountainous terrain. Generally, it is understood that the slope of a mountain may have an impact on the EV range and that it may be wiser (or more battery efficient) to go around it. However, the impact of the weather conditions while driving on the mountain may not have been previously considered, i.e. taking into account that there will be a severe temperature drop once there, which may alter even more the range. For example, different locations along the slope of the mountain may have different temperatures. At intermediate locations along the mountain route, weather data for these intermediate locations may be queried.

FIG. 8 illustrates an exemplary mountain region 800, where the concentric ellipses represent altitude lines for the mountain region 800. The upper line (shown as a wavy line), represents a shorter route through the mountain, but which is subject to range variations owing to temperature variations along the mountain slope. The other line, a lower line represents a longer route avoiding the mountain, but which is free from the effects of range variations due to variations of mountain slope. While the lower route will be longer, it will avoid the mountain and the expected temperature drops associated with the upper route, and may be a better choice if terms of offering more range stability.

Further, in some embodiments, the SOC prediction or the range forecast for the EV may be adjusted according to the weather data at different locations along the slope of the mountain. Such a scenario may be factored in using the methods and systems disclosed herein, to provide a more accurate and reliable range prediction for the EV, considering the impact of weather conditions on the battery charge levels for the EV, as discussed previously, and also depicted in the graph of FIG. 9.

FIG. 9 is an exemplary user interface 900 providing a time slider visualization for the range of the EV in accordance with an embodiment of the present invention. The time based isoline visualizer may include a map based graphical interface and a slider superimposed on the map interface. The sliding of a knob or icon along a time axis on the map based interface 900 may provide a visualization of days in future and seeing the related range evolve over time in relation to the weather conditions. In addition, as future locations may have been previously derived from the mobility profile, the sliding of a knob along the time axis may change the epicenter of the isoline representation to reflect the predicted location. In some embodiments, the epicenter may change in a discrete fashion, i.e. from one stationary location to the next. In some embodiments, the epicenter may change in a continuous fashion, for example along the predicted route. The prediction of route and future location may be based on the mobility profile of the EV.

FIG. 10 illustrates exemplary data records for predicting range of an EV based on mobility profile data, in accordance with an embodiment of the present invention. The exemplary data records 1000 may include a table showing locations 1002, a table showing user displacements 1004 or user's trips between specific origin and destination locations and a table showing calendar entries 1006. The calendar entries may indicate which POI or location (in terms of latitude and longitude coordinates) are visited by the user at what particular days and/or times of day. Based on the location, displacement and calendar entries, the mobility profile of the user may be inferred. For example, the table 1008 illustrates displacements that the user may plan to make on specific days, times and using a generally taken route and mode of transport (EV in the current case). The table 1008 may be inferred based on the data stored in the tables 1002, 1004, and 1008.

In some example embodiments, the table of locations, 1002, may be used to determine the locations where the vehicle will be stationary, while the table of displacements, 1004, may provide an indication of vehicle's route and mode of transport (which is EV in the exemplary embodiments of the present disclosure). Further, the table of locations, 1002, and the table of displacements, 1004, may provide derived behaviors from learnt vehicle and/or user movements. The table of displacements, 1004, may also include a column for RouteID, where an entry RouteIDa translates to a set of locations, e.g. (Location z, location y, location x).

Using the tables 1002 and 1004, predictions related to future location of the vehicle (EV in this case) may be derived, such as for a given weekday. However, in some embodiments, the prediction may be made for a specific month or season, i.e. have a validity period. In addition, calendar entries of the user may be utilized to derive future locations and infer routes that correspond to the calendar entries and the learnt mobility profile. In some example embodiments, calendar entries may take precedence over predicted locations and displacements, as such user inputs indicate a stronger intention to deviate from usual behavior. In some example embodiments, the displacements mentioned in the table of displacements, 1004, may be used to characterize routes, covering a distance traversing several locations. In case that the locations may significantly apart from each other, in particular at different altitude levels, weather information queries for the individual locations along the route may be generated.

In some embodiments, if the locations are significantly apart, then the distance between two locations may be large enough to have significant temperature differences between both locations.

Further, the tables 1002-1004, along with the table of calendar entries 1006 may be used to define a mobility profile for the user.

The data tables 1002-1008 may be used to define a mobility profile for the EV, using the data about the user's undertaken routes for reaching different locations, user's planned displacements or appointments, the coordinate data for different locations or POIs, and using all these to retrieve weather data for different locations and times. The exemplary mobility profile of FIG. 10 reflects a vehicle-based mobility profile for an EV. However, more complex mobility profiles may be derived for a single user, including different modes of transport and even multiple EVs. Further, in some embodiments, POIs, addresses and coordinate pairs may be used interchangeably in mobility profiles, as the mapping platform 108 may be used to derive an address, POI or a coordinate pair with either piece of information.

FIG. 11 illustrates an exemplary flow diagram of a method 1100 for generating SOC forecast for an EV based on mobility profile data, in accordance with an embodiment.

The method of FIG. 11 may be used as a continuation of the method 500 discussed earlier. The method 1100 may be used for generating an SOC forecast for the EV, for a specific time period, such as until the next planned use of the vehicle. The method 1100 may include at 1102 determining an SOC forecast range of time or duration for determining a weather forecast. For example, based on a mobility profile of the user, it may be determined which locations and/or displacements the user may visit and/or undertake during a given weekday. The corresponding mobility profile may have an associated a validity period (such as a month, season, etc.). Further, for the valid mobility profile, the particular weekday may then be associated with a given date within the SOC forecast range. The method 1100 may further include, at 1104, retrieving weather related data for the locations and times, or dates, lying within the time period range covered by the mobility profile. The weather data may be obtained, such as by querying the weather service 114. The weather data may include, in some embodiments, temperature data of the outside weather for the time and/or time ranges and the locations where the vehicle will be in the future, as determined based on the mobility profile, such as by specifying location and time as search query parameters for the weather service 114. As weather forecasts tend to change as soon as weather models are updated, additional queries to the weather service 114 may be made, for instance, at predetermined time intervals (e.g. every 3 hours, every 6 hours, every 12, every day, every 2 days, etc.) in order to further update the range forecast. The search query may be performed via an API of the weather service 114. The weather service 114 in turn returns the weather forecast data, indicating the expected temperatures for each location for the given time ranges. In some embodiments, other weather data (such as humidity, wind speed, sunlight, UV radiation, etc.) may be provided as part of the weather data provided by the weather service 114. Once the weather data has been identified, the method 1100 may include, at 1106, generating the SOC forecast for the vehicle, such as the EV, for different locations based on the weather data. This SOC forecast may further be used to provide recommendations to the user related to their route of travel towards predicted future locations.

In some example embodiments, the SOC forecast may also be used to provide recommendations related to scheduling of charging events for the EV.

The SOC forecast for different locations, as determined using the method 1100 may be depicted in the form of a graph, as shown in FIG. 12.

FIG. 12 illustrates an exemplary graph 1200 showing the impact of temperature on the range/SOC of an EV, in accordance with an embodiment of the invention.

The graph 1200 depicts temperature (in ° C.) and SOC (in %) values (Y-axis) for different locations and date/time combinations (X-axis). Thus, the graphical representation 1200 of FIG. 12 illustrates SOC forecast information, while taking into account the changes in location. The figure is based on the mobility profile data example of FIG. 10 and provides a 6 day forecast for the vehicle. In the example, the energy consumption model of the EV looks at temperature dips below 5° C. Note that the SOC remains constant on the night of November 6 because: 1) the location stays the same and 2) the temperature stays above 5° C. However, on the night of November 7, while at home, the temperature drops below 5°, which has an effect on the SOC, as depicted in the slight drop in SOC on the same date, i.e. November 7. The graph 1200 depicts only certain exemplary scenarios, and it would be understandable to a person of ordinary skill in the art that various predictions can be made based on a more detailed SOC forecast model and with higher granularity of location/time ranges, weather predictions, etc.

As can be observed from the graph 1200, there may be higher drops in battery charge levels or SOC on very cold days, such as for temperatures below 5° C. Thus, using the methods and systems disclosed herein, it may be possible to provide better range prediction to users of EV by taking into account the impact of weather on the range of an electric vehicle. Also, it may be possible to provide higher visibility for users on the SOC and related range which may in turn provide better risk reductions for users who are informed earlier of "range related risks" and related change of plans. Another advantage of using the methods and systems disclosed herein is that the user may be actively provided alert notifications if range of the EV is reduced below some threshold. Apart from these, in some embodiments recommendations of when to optimally charge/not charge the EV may be provided. The recommendations, notifications, and alerts may be provided to the user on an output interface, which may be a part of the vehicle or of a user device associated with the vehicle.

In some example embodiments, the SOC forecast may be used to provide a recommendation to the user of the EV regarding recharging of the EV. For example, based on the amount of charge remaining in the EV, a location of the nearest recharge station reachable by the EV may be determined and time and place (location of recharge station) for recharge may be indicated to the user on the output interface. In some example embodiments the SOC forecast may be provided to the user in a graphical form similar to FIG. 12 via a User Interface of the device 104.

In some example embodiments, using the SOC forecast model, the range of the EV may be predicted for different time and location combinations, such that the location may correspond to a future predicted location of the EV. Thus, the SOC forecast may be also be used to provide range forecast for the EV, which may further help the user to better prepare for their planned appointments and trips using the EV.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A system for prediction of range of an electric vehicle, the system comprising:
   at least one memory configured to store computer program code; and
   at least one processor configured to execute the computer program code to:
   determine future location prediction data for the electric vehicle based on a mobility profile, wherein the mobility profile comprises historical usage data for the electric vehicle;
   retrieve weather data from a weather service provider, wherein the weather data is associated with the future location prediction data of the electric vehicle, wherein the weather data includes at least temperature data associated with the future location prediction data of the electric vehicle;
   calculate a range prediction value for the electric vehicle based on the future location prediction data and the weather data, for predicting the range of the electric vehicle; and
   provide a notification associated with the predicted range of the electric vehicle to a user device, wherein the notification is provided in an interface comprising a time slider graph based on visual depiction of a plurality of locations reachable from a current location of the electric vehicle based on the predicted range of the electric vehicle.

2. The system of claim 1, wherein to calculate the range prediction value, the processor is further configured to execute the computer program code to:
determine a current charge level and a charge consumption model for a battery of the electric vehicle; and
calculate the range prediction value for the electric vehicle based on the current charge level, the charge consumption model, the future location prediction data, and the weather data, for predicting the range of the electric vehicle.

3. The system of claim 1, wherein the future location prediction data for the electric vehicle is associated with a planned appointment of a user of the electric vehicle.

4. The system of claim 1, wherein retrieving weather data associated with the future location prediction data of the electric vehicle comprises retrieving the weather data for a predetermined duration of time, wherein the predetermined duration of time comprises a duration of time until a next planned use of the electric vehicle after a current use of the electric vehicle.

5. The system of claim 4, wherein the weather data comprises weather forecast data for outside temperature for the predetermined duration of time.

6. The system of claim 4, wherein retrieving the weather data further comprises downloading weather forecast data from the weather service provider for the predetermined duration of time.

7. The system of claim 1, wherein to provide the notification associated with the predicted range the processor is further configured to execute the computer program code to provide a recommendation to avoid stopping the electric vehicle based on determining that the predicted range of the electric vehicle falls below a predetermined distance threshold.

8. A method for predicting a range of an electric vehicle, comprising:
determining future location prediction data for the electric vehicle based on a mobility profile, wherein the mobility profile comprises historical usage data for the electric vehicle;
retrieving weather data associated with the future location prediction data of the electric vehicle, wherein the weather data includes at least temperature data associated with the future location prediction data of the electric vehicle;
calculating, by a processor, a range prediction value for the electric vehicle based on the future location prediction data and the weather data, for predicting the range of the electric vehicle; and
providing a notification associated with the predicted range of the electric vehicle to a user device,
wherein the notification is provided in an interface comprising a time slider graph based on visual depiction of a plurality of locations reachable from a current location of the electric vehicle based on the predicted range of the electric vehicle.

9. The method of claim 8 wherein calculating the range prediction value further comprises:
determining a current charge level and a charge consumption model for a battery of the electric vehicle; and
calculating the range prediction value for the electric vehicle based on the current charge level, the charge consumption model, the future location prediction data, and the weather data, for predicting the range of the electric vehicle.

10. The method of claim 8, wherein the future location prediction data for the electric vehicle is associated with a planned appointment of a user of the electric vehicle.

11. The method of claim 8, wherein retrieving weather data associated with the future location prediction data of the electric vehicle comprises retrieving the weather data for a predetermined duration of time, wherein the predetermined duration of time comprises a duration of time until a next planned use of the electric vehicle after a current use of the electric vehicle.

12. The method of claim 11, wherein the weather data comprises weather forecast data for outside temperature for the predetermined duration of time.

13. The method of claim 12, wherein retrieving the weather data further comprises downloading weather forecast data from the weather service provider for the predetermined duration of time.

14. The method of claim 8, wherein providing the notification associated with the predicted range comprises providing a recommendation to avoid stopping the electric vehicle based on determining that the predicted range of the electric vehicle falls below a predetermined distance threshold.

15. The method of claim 8, wherein at least one of the plurality of locations is a charging station.

16. The method of claim 8, wherein the mobility profile for the electric vehicle is associated with historical usage data related to charging of the electrical vehicle, and wherein the mobility profile is used to determine next planned charging event for the electric vehicle after the current use of the electric vehicle.

17. A non-transitory computer-readable medium having stored thereon, computer-executable instructions which when executed by a computer, cause the computer to carry out operations for predicting range of an electric vehicle, the operations comprising:
determining future location prediction data for the electric vehicle based on a mobility profile, wherein the mobility profile comprises historical usage data for the electric vehicle;
retrieving weather data associated with the future location prediction data of the electric vehicle from a weather service provider, wherein the weather data includes at least temperature data associated with the future location prediction data of the electric vehicle;
calculating a range prediction value for the electric vehicle based on the future location prediction data and the weather data, for predicting the range of the electric vehicle; and
providing a notification associated with the predicted range of the electric vehicle to a user device,
wherein the notification is provided in an interface comprising a time slider graph based on visual depiction of a plurality of locations reachable from a current location of the electric vehicle based on the predicted range of the electric vehicle.

* * * * *